US012415259B2

(12) United States Patent
Wadeson

(10) Patent No.: US 12,415,259 B2
(45) Date of Patent: Sep. 16, 2025

(54) IMPACT POWER TOOL AND IMPACT MECHANISM

(71) Applicant: Black & Decker Inc., New Britain, CT (US)

(72) Inventor: Peter Wadeson, Silver Spring, MD (US)

(73) Assignee: BLACK & DECKER INC., New Britain, CT (US)

(*) Notice: Subject to any disclaimer, the term of this patent is extended or adjusted under 35 U.S.C. 154(b) by 0 days.

(21) Appl. No.: 18/782,918

(22) Filed: Jul. 24, 2024

(65) Prior Publication Data

US 2025/0042008 A1 Feb. 6, 2025

Related U.S. Application Data

(60) Provisional application No. 63/517,277, filed on Aug. 2, 2023.

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ............................ B25B 23/1475; B25B 21/02
USPC ........................................................ 173/93.5
See application file for complete search history.

(56) References Cited

U.S. PATENT DOCUMENTS 2,263,709 A 11/1941 Sittert
2,523,584 A 9/1950 Miller
2,561,913 A 7/1951 Dodge
2,745,528 A * 5/1956 Amtsberg ............ B25B 21/026 173/93.6
3,001,428 A * 9/1961 Sindelar ................ B25B 21/026 173/93.6
3,001,429 A * 9/1961 Sindelar ................ B25B 21/026 173/93.6
3,053,360 A 9/1962 Axel
3,106,274 A 10/1963 Axel
3,546,957 A 12/1970 Adams (Continued)

FOREIGN PATENT DOCUMENTS

DE 4328599 C2 1/1998
DE 102018207628 A1 11/2019

(Continued)

OTHER PUBLICATIONS

Extended European Search Report, EP Application No. 24191590.9, Jan. 16, 2025, 7 pages, EPO.

*Primary Examiner* — Dariush Seif
(74) *Attorney, Agent, or Firm* — Scott B. Markow

(57) ABSTRACT

A rotary impact tool includes a motor and an impact mechanism. The impact mechanism includes a cam shaft with a first cam groove rotatably driven by the motor, a cam ring received over the cam shaft with a second cam groove on its inner surface and a third cam groove on its outer surface, a hammer received over the cam ring with a fourth cam groove on its inner surface, an anvil with an output shaft and configured to be selectively engaged by the hammer, a spring configured to bias the hammer toward the anvil, a first ball received in the first and second cam grooves to couple the cam ring to the cam shaft, and a second ball received in the third and fourth cam grooves to couple the hammer to the cam ring.

20 Claims, 13 Drawing Sheets

(56) References Cited

U.S. PATENT DOCUMENTS

| | | | | |
|---|---|---|---|---|
| 4,249,617 | A | 2/1981 | Cox, Jr. | |
| 4,967,888 | A | 11/1990 | Lippacher et al. | |
| 5,346,023 | A | 9/1994 | Takagi et al. | |
| 5,409,324 | A | 4/1995 | Johnson, Jr. | |
| 5,588,496 | A | 12/1996 | Elger | |
| 5,588,772 | A | 12/1996 | Johnson, Jr. | |
| 5,836,403 | A * | 11/1998 | Putney | B25B 21/02 173/205 |
| 6,733,414 | B2 * | 5/2004 | Elger | B25B 21/02 173/205 |
| 7,051,820 | B2 | 5/2006 | Stirm | |
| 7,861,797 | B2 * | 1/2011 | Hartmann | B25D 16/003 192/56.62 |
| 8,925,646 | B2 | 1/2015 | Seith et al. | |
| 9,016,453 | B2 | 4/2015 | Albrecht et al. | |
| 9,022,888 | B2 | 5/2015 | McClung | |
| 9,550,284 | B2 | 1/2017 | Seith et al. | |
| 9,592,600 | B2 * | 3/2017 | Seith | B25F 5/02 |
| 9,827,660 | B2 | 11/2017 | Blum et al. | |
| 10,131,037 | B2 | 11/2018 | Seith et al. | |
| 10,315,298 | B2 * | 6/2019 | Herr | B25D 16/006 |
| 10,315,299 | B2 * | 6/2019 | Herr | B25D 16/00 |
| 10,583,544 | B2 * | 3/2020 | Herr | B25D 16/00 |
| 10,960,526 | B2 | 3/2021 | Herr | |
| 11,185,963 | B2 * | 11/2021 | Teh | B25D 11/104 |
| 11,235,444 | B2 | 2/2022 | Muramatsu et al. | |
| 11,484,997 | B2 | 11/2022 | Schneider et al. | |
| 11,872,680 | B2 * | 1/2024 | Petrus | B25F 5/02 |
| 2010/0319945 | A1 * | 12/2010 | Chen | B23B 45/008 173/48 |
| 2018/0001444 | A1 | 1/2018 | Matsushita et al. | |
| 2020/0001440 | A1 * | 1/2020 | Lee | B25B 21/002 |
| 2021/0187717 | A1 * | 6/2021 | McClung | B25B 21/02 |
| 2023/0191502 | A1 * | 6/2023 | Aoyama | B23B 31/107 279/75 |
| 2023/0191566 | A1 * | 6/2023 | Kamiya | B25B 21/026 173/93 |
| 2023/0364749 | A1 * | 11/2023 | Kusumoto | B25B 21/02 |
| 2023/0398665 | A1 * | 12/2023 | Aoki | B25B 21/026 |
| 2024/0058927 | A1 * | 2/2024 | Yamanaka | B25B 21/026 |
| 2024/0326203 | A1 * | 10/2024 | Bothmann | B25B 21/02 |
| 2025/0042008 | A1 * | 2/2025 | Wadeson | B25B 21/026 |

FOREIGN PATENT DOCUMENTS

| | | | |
|---|---|---|---|
| EP | 0839612 | A1 | 5/1998 |
| EP | 4163058 | A1 | 4/2023 |
| GB | 852752 | A | 11/1960 |
| JP | 2010052101 | A | 3/2010 |
| JP | 2013144341 | A | 7/2013 |
| JP | 2015009310 | A | 1/2015 |
| WO | 2018042872 | A1 | 3/2018 |
| WO | 2018061387 | A1 | 4/2018 |

* cited by examiner

IMPACT POWER TOOL AND IMPACT MECHANISM

RELATED APPLICATION

This application claims priority under 35 U.S.C. § 119 (e) to U.S. Provisional Patent Application No. 63/517,277, filed Aug. 2, 2023, titled "Impact Power Tool and Impact Mechanism," which is incorporated by reference in its entirety.

TECHNICAL FIELD

This application relates to impact power tools, such as impact drivers or impact wrenches, and impact mechanisms for impact power tools.

BACKGROUND

Impact power tools, such as impact drivers and impact wrenches are commonly used for the installation and removal of threaded fasteners. An example of an impact power tool is described in U.S. Pat. App. Pub. No. 2019/0344411, which is incorporated by reference.

SUMMARY

In an aspect, an impact tool includes a housing; a motor disposed in the housing; an output tool holder; a transmission configured to be driven by the motor; and an impact mechanism configured to be driven by the transmission and to transmit torque from the transmission to the output tool holder. The impact mechanism includes a cam shaft extending along an axis and configured to be rotatably driven by an output member of the transmission, the cam shaft defining a first angled or curved (e.g., V-shaped, U-shaped, parabolic) cam groove on an outer surface of the cam shaft; a cam ring received over the cam shaft and defining a second angled or curved (e.g., V-shaped, U-shaped, parabolic) cam groove on an inner surface of the cam ring and a third angled or curved (e.g., V-shaped, U-shaped, parabolic) cam groove on an outer surface of the cam ring; a hammer received over the cam ring and defining a fourth angled or curved (e.g., V-shaped, U-shaped, parabolic) cam groove on an inner surface of the hammer and including a hammer projection on a front portion of the hammer; an anvil coupled to the output tool holder and having a anvil projection configured to be selectively engaged by the hammer lug; a spring configured to bias the hammer toward the anvil; a first ball received in the first cam groove and the second cam groove and configured to couple the cam ring to the cam shaft for rotational and axial movement relative to the cam shaft; and a second ball received in the third cam groove and the fourth cam groove and configured to couple the hammer to the cam ring for rotational and axial movement relative to the cam ring. When torque on the output tool holder is less than or equal to a threshold amount, the spring maintains the cam ring and the hammer in their forwardmost position relative to the cam shaft so that the hammer projection engages the anvil projection and the cam shaft, the cam ring, the hammer, and the anvil rotate together as a unit about the axis. When torque on the output tool holder increases to exceeds the threshold amount, the first ball moves along the first and second cam grooves so that the cam ring moves rotatably and axially rearward relative to the cam shaft, the second ball moves along the third and fourth cam grooves, so that the hammer moves rotatably and axially rearward relative to the cam ring, which decouples the hammer projections from the anvil projections. When the spring force and the torque of the motor overcomes the inertia of the hammer, the spring drives the cam ring rotationally and axially forward relative to the cam shaft and the hammer rotationally and axially forward relative to the cam ring, such that the hammer projection rotationally strikes the anvil projection to impart a rotational impact to the anvil.

In another aspect, a powered rotary impact tool includes a housing, a motor disposed in the housing, an output shaft, a transmission configured to be driven by the motor, and an impact mechanism configured to be driven by the transmission and to transmit torque from the transmission to the output tool holder. The impact mechanism includes a cam shaft extending along an axis and configured to be rotatably driven by an output member of the transmission, the cam shaft defining a first cam groove on an outer surface of the cam shaft. A cam ring is received over the cam shaft and defines a second cam groove on an inner surface of the cam ring and a third cam groove on an outer surface of the cam ring. A hammer is received over the cam ring and defines a fourth cam groove on an inner surface of the hammer and including a hammer projection on a front portion of the hammer. An anvil is coupled to the output shaft for rotation with the output shaft. The anvil has an anvil projection configured to be selectively engaged by the hammer projection. A first spring is configured to bias the hammer toward the anvil. A first ball is received in the first cam groove and the second cam groove and configured to couple the cam ring to the cam shaft for rotational and axial movement relative to the cam shaft. A second ball is received in the third cam groove and the fourth cam groove and configured to couple the hammer to the cam ring for rotational and axial movement relative to the cam ring. When torque on the output shaft is less than or equal to a threshold amount, the first spring maintains the hammer in its forwardmost position relative to the cam shaft so that the hammer projection engages the anvil projection, and the cam shaft, the cam ring, the hammer, and the anvil rotate together as a unit about the axis. When torque on the output shaft increases to exceeds the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the first spring force and the torque of the motor overcomes the inertia of the hammer, the first spring drives the cam ring rotationally and axially forward relative to the cam shaft and the hammer rotationally and axially forward relative to the cam ring, such that the hammer projection rotationally strikes the anvil projection to impart a rotational impact to the anvil.

Implementations of this aspect may include one or more of the following features. The first cam groove and the second cam groove are angled or curved. The first cam groove is V-shaped with an open end of the first cam groove facing rearward away from the anvil. The second cam groove is V-shaped with an open end of the second cam groove facing forward toward the anvil. The third cam groove and the fourth cam groove are angled or curved. The third cam groove is V-shaped with an open end of the first cam groove facing rearward away from the anvil. The fourth cam groove is V-shaped with an open end of the second cam groove facing forward toward the anvil. The third cam groove is angularly offset from the first cam groove and the fourth cam groove is angularly offset from the second cam groove. The first spring is disposed between the transmission and the hammer. A second spring is disposed between the transmission and the cam ring.

In another aspect, a powered rotary impact tool includes a cam shaft extending along an axis and configured to be rotatably driven upon actuation of the power tool. The cam shaft defines a first cam groove on an outer surface of the cam shaft. A cam ring is received over the cam shaft and defines a second cam groove on an inner surface of the cam ring and a third cam groove on an outer surface of the cam ring. A hammer is received over the cam ring and defines a fourth cam groove on an inner surface of the hammer and includes a hammer projection on a front portion of the hammer. An anvil includies an output shaft and an anvil projection configured to be selectively engaged by the hammer projection. A first spring is configured to bias the hammer toward the anvil. A first ball is received in the first cam groove and the second cam groove and configured to couple the cam ring to the cam shaft for rotational and axial movement relative to the cam shaft. A second ball is received in the third cam groove and the fourth cam groove and configured to couple the hammer to the cam ring for rotational and axial movement relative to the cam ring. When torque on the output shaft is less than or equal to a threshold amount, the first spring maintains the hammer in its forwardmost position relative to the cam shaft so that the hammer projection engages the anvil projection, and the cam shaft, the cam ring, the hammer, and the anvil rotate together as a unit about the axis. When torque on the output shaft increases to exceed the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the first spring force and the torque of the motor overcomes the inertia of the hammer, the first spring drives the cam ring rotationally and axially forward relative to the cam shaft and the hammer rotationally and axially forward relative to the cam ring, such that the hammer projection rotationally strikes the anvil projection to impart a rotational impact to the anvil.

Implementations of this aspect may include one or more of the following features. The first cam groove and the second cam groove are angled or curved. The first cam groove is V-shaped with an open end of the first cam groove facing rearward away from the anvil. The second cam groove is V-shaped with an open end of the second cam groove facing forward toward the anvil. The third cam groove is V-shaped with an open end of the first cam groove facing rearward away from the anvil The fourth cam groove is V-shaped with an open end of the second cam groove facing forward toward the anvil. The third cam groove is angularly offset from the first cam groove and the fourth cam groove is angularly offset from the second cam groove. The first spring is disposed between the transmission and the hammer. A second spring is disposed between the transmission and the cam ring.

A powered rotary impact tool includes a housing, a motor disposed in the housing, an output shaft, a tool holder coupled to the output shaft for rotation with the output shaft, a transmission configured to be driven by the motor, and an impact mechanism configured to be driven by the transmission and to transmit torque from the transmission to the output tool holder. The impact mechanism includes a cam shaft extending along an axis and configured to be rotatably driven by an output member of the transmission, the cam shaft defining a first V-shaped cam groove on an outer surface of the cam shaft. A cam ring is received over the cam shaft and defines a second V-shaped cam groove on an inner surface of the cam ring facing an opposite direction from the first V-shaped cam groove, and a third V-shaped cam groove on an outer surface of the cam ring offset angularly from the first V-shaped cam groove. A hammer is received over the cam ring and defines a fourth V-shaped cam groove on an inner surface of the hammer facing an opposite direction from the third V-shaped cam groove and offset angularly from the second V-shaped cam groove, the hammer including a hammer projection on a front portion of the hammer. An anvil is coupled to the output shaft for rotation with the output shaft, the anvil having an anvil projection configured to be selectively engaged by the hammer projection. A spring is between the transmission and the hammer to bias the hammer toward the anvil. A first ball is received in the first cam groove and the second cam groove and configured to couple the cam ring to the cam shaft for rotational and axial movement relative to the cam shaft. A second ball is received in the third cam groove and the fourth cam groove and configured to couple the hammer to the cam ring for rotational and axial movement relative to the cam ring. When torque on the output shaft is less than or equal to a threshold amount, the spring maintains the hammer in its forwardmost position relative to the cam shaft so that the hammer projection engages the anvil projection, and the cam shaft, the cam ring, the hammer, and the anvil rotate together as a unit about the axis. When torque on the output shaft increases to exceed the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the spring force and the torque of the motor overcomes the inertia of the hammer, the spring drives the cam ring rotationally and axially forward relative to the cam shaft and the hammer rotationally and axially forward relative to the cam ring, such that the hammer projection rotationally strikes the anvil projection to impart a rotational impact to the anvil.

Advantages may include one or more of the following. The present application enables a stiffer spring to be used while achieving the same or greater torque output with less axial travel of the hammer. In addition, the addition of a cam ring that is nested between the cam shaft and the hammer cam shaft and the hammer enables greater rotational travel of the hammer relative to the cam shaft in the same or smaller axial distance of travel, which may enable greater torque output. These and other advantages and features will be apparent from the description, the drawings, and the claims.

DETAILED DESCRIPTION

Figure 1:
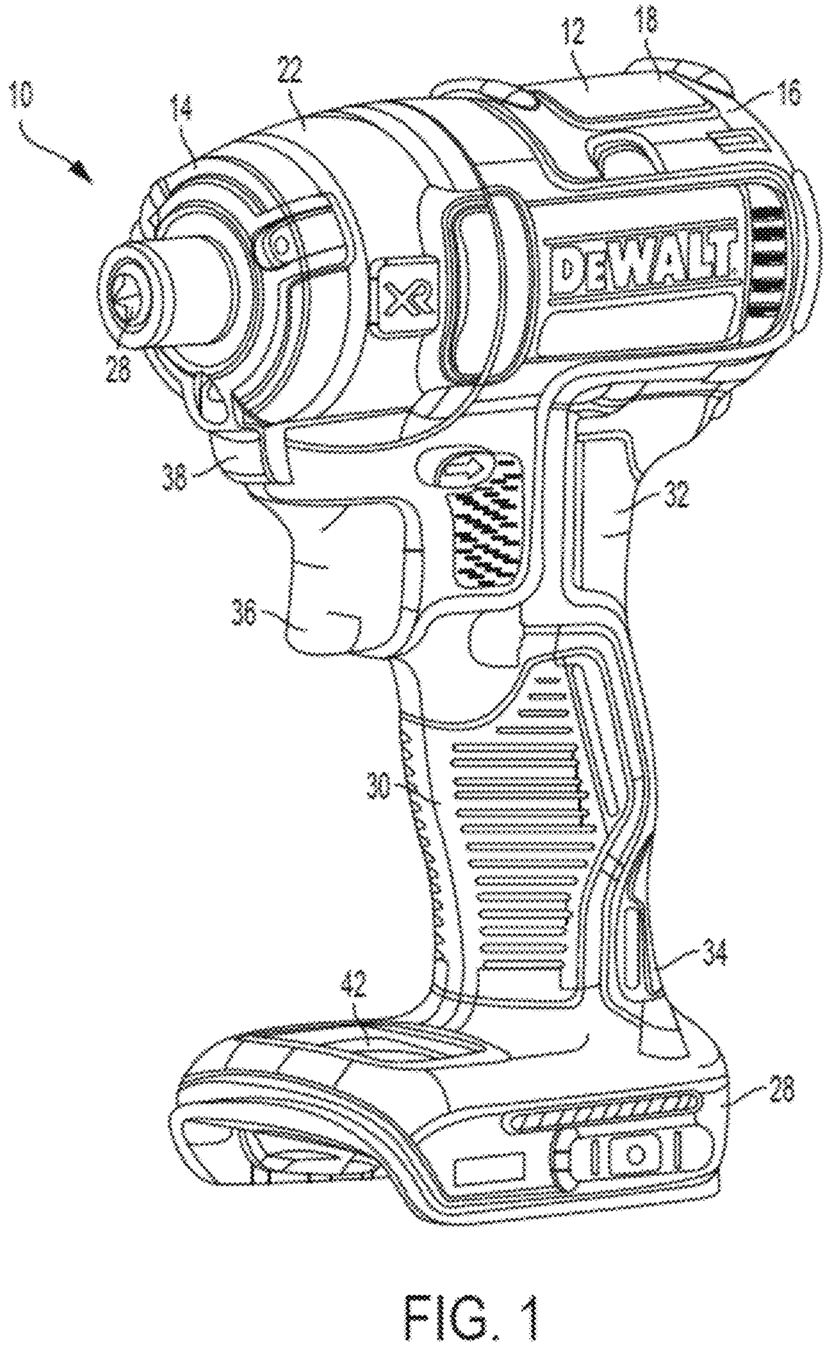
FIG. 1 is a perspective view of an embodiment of an impact tool.
Figure 2:
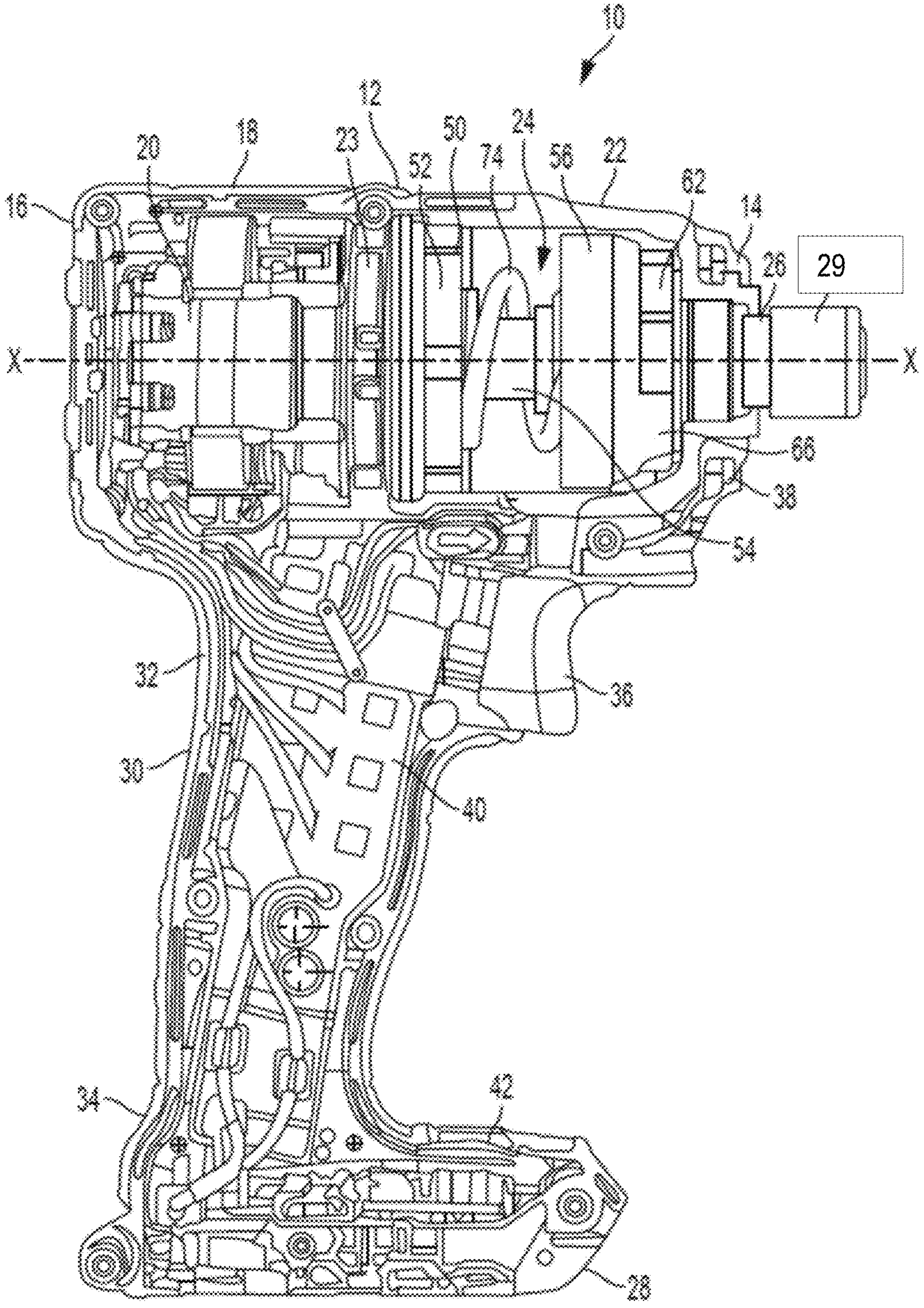
FIG. 2 is a side view of the impact tool of FIG. 1 with a portion of the housing removed.

Referring to FIGS. 1 and 2, in an embodiment, an impact tool 10 has a housing 12 having a front end portion 14 and a rear end portion 16. The housing 12 includes a motor housing portion 18 that contains a rotary motor 20 and a transmission housing portion 22 that contains a transmission 23 and an impact mechanism 24. The transmission 23 and impact mechanism 24 transmit rotary motion from the motor 20 to an output spindle 26, as described in greater detail below. Coupled to the output spindle 26 is a tool holder 29 for retaining a tool (e.g., a drill bit, screw driving bit, a socket, etc., not shown). The output spindle 26 and the tool holder 29 together define and extend along a tool axis X. As shown, the tool holder 29 quick release hex bit retention mechanism. In other embodiments, the tool holder may be a non-quick release hex bit retention mechanism, a keyed or keyless chuck, or a square socket. Further details regarding exemplary tool holders are set forth in commonly-owned U.S. patent application Ser. No. 12/394,426, which is incorporated herein by reference.

Extending downward and slightly rearward of the housing 12 is a handle 30 in a pistol grip formation. The handle 30 has a proximal portion 32 coupled to the housing 12 and a distal portion 34 coupled to a battery receptacle 28. The motor 20 may be powered by an electrical power source, such as a DC power source or battery (not shown), that is coupled to the battery receptacle 28, or by an AC power source. A trigger 36 is coupled to the handle 30 adjacent the housing 12. The trigger 36 connects the electrical power source to the motor 20 via a controller 40 and may control an amount of power delivery to the motor 20, as described in greater detail below. A light unit (e.g., an LED) 38 may be disposed on the front end portion 14 of the housing 12, just below the tool holder 29 to illuminate an area in front of the tool holder 29. Alternatively, the light unit may be disposed on a front end portion of the battery receptacle 28 Power delivery to the light unit 38 may be controlled by the trigger 36 and the controller 40, or by a separate switch on the tool.

Figure 3:
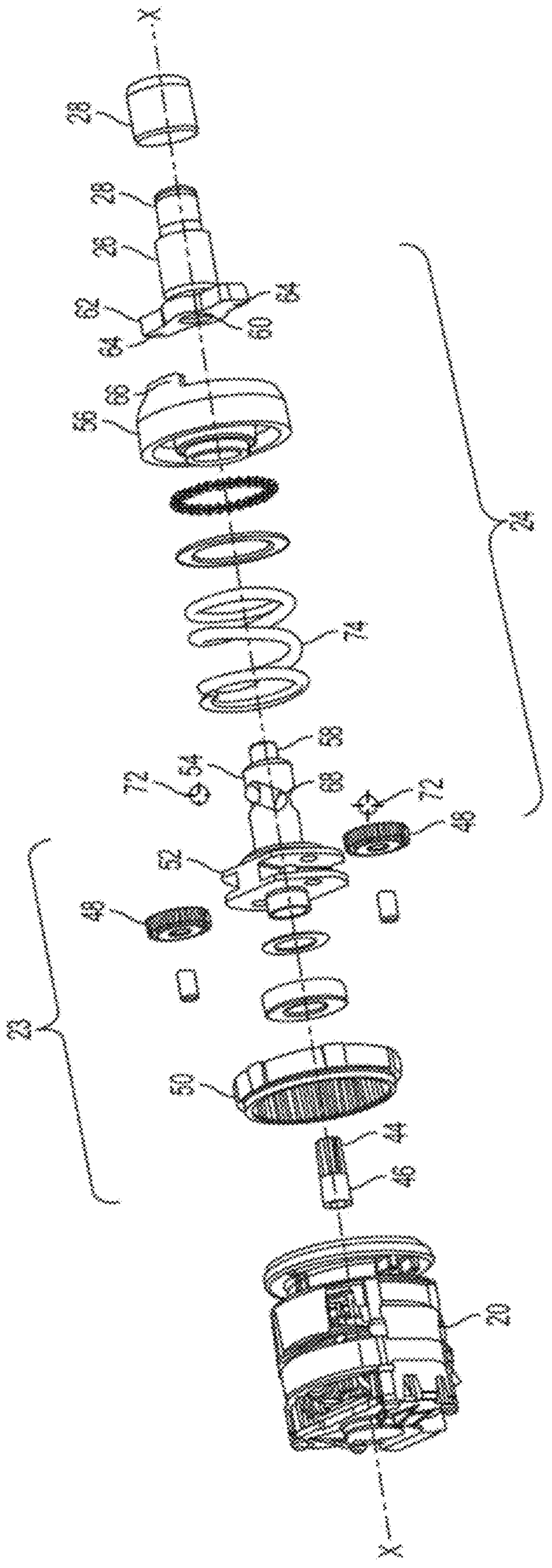
FIG. 3 is an exploded view of the motor, transmission, and impact mechanism of the impact tool of FIG. 1.
Figure 4:
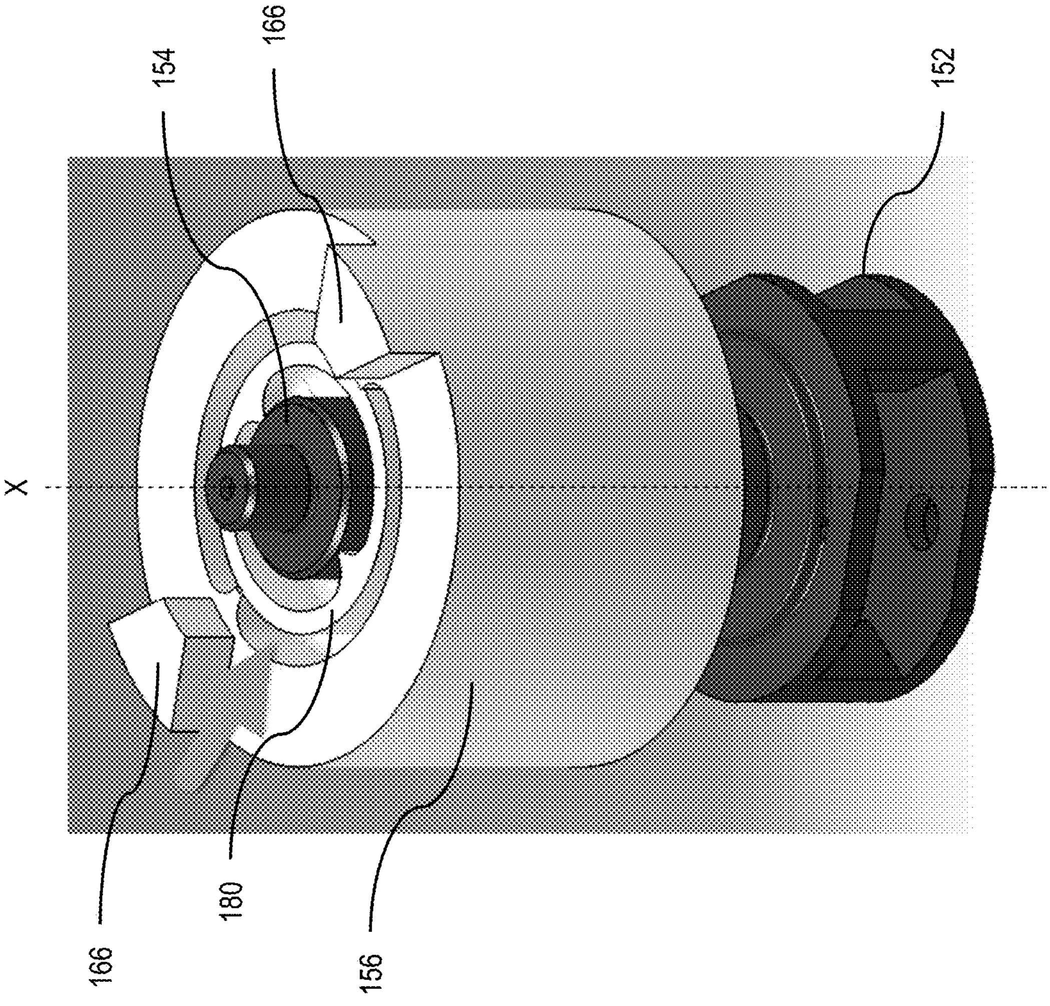
FIG. 4 is a perspective view of an embodiment of an impact mechanism.
Figure 5:
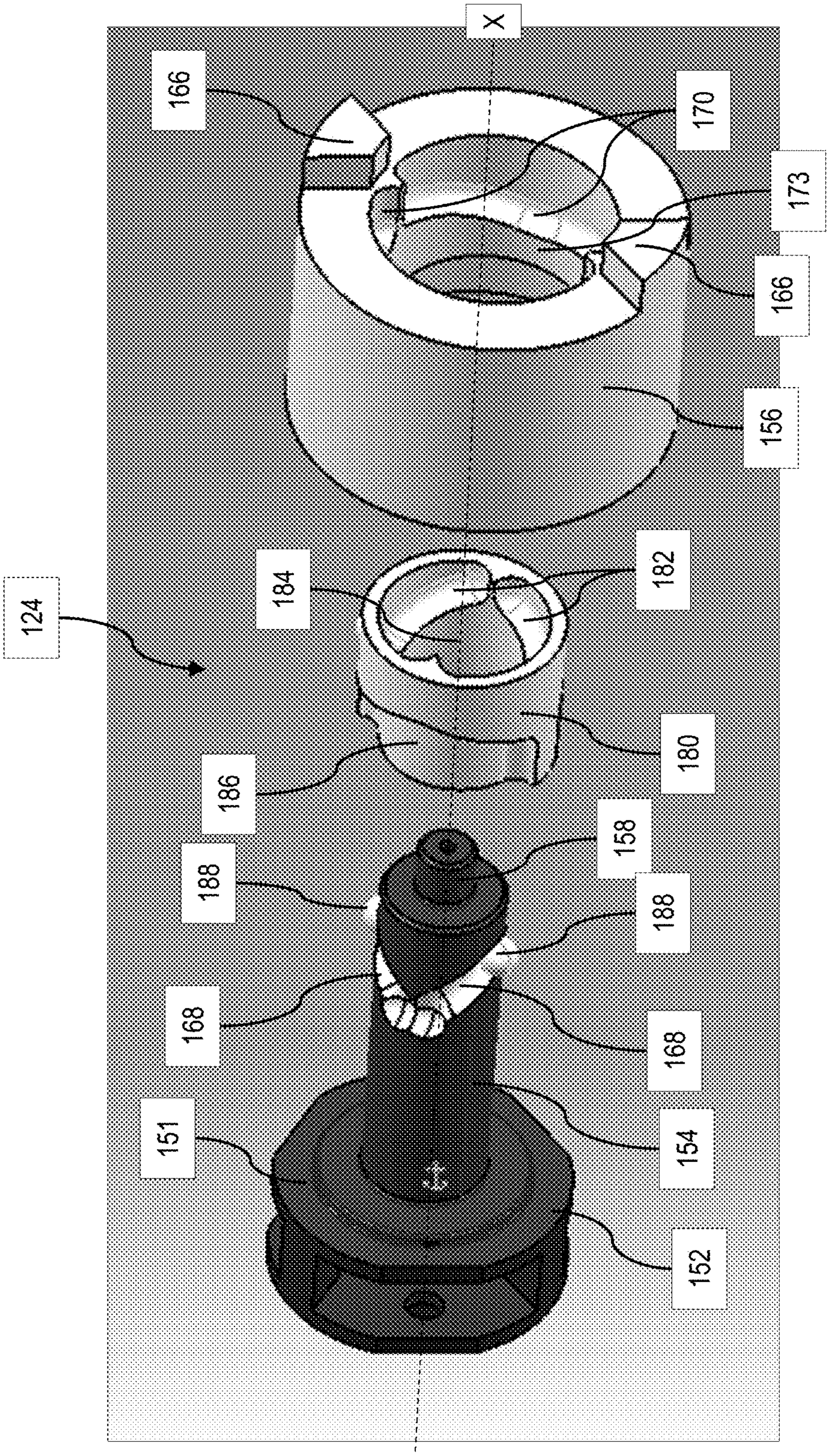
FIG. 5 is an exploded view of the impact mechanism of FIG. 4
Figure 6:
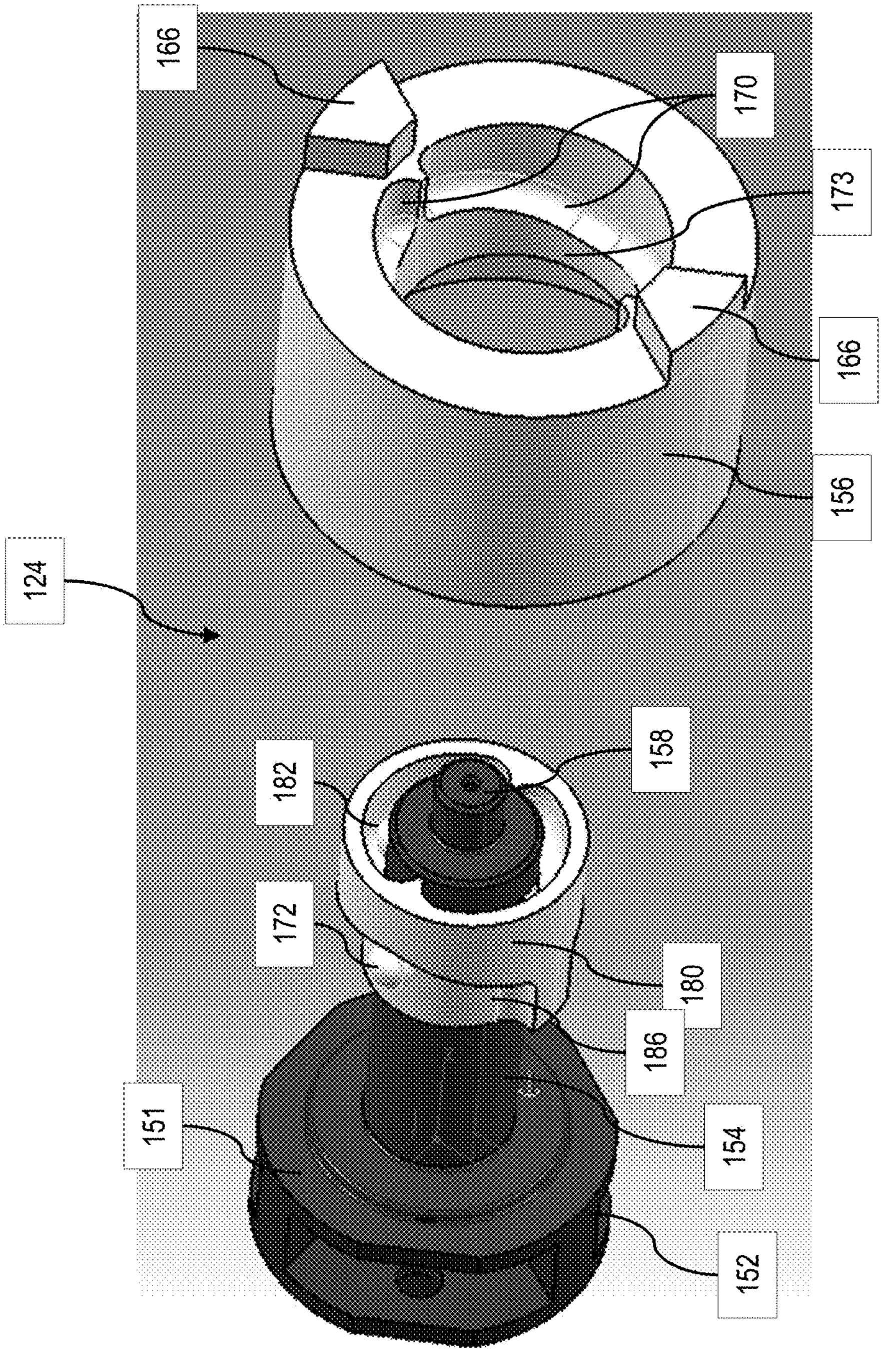
FIG. 6 is a partially exploded view of the impact mechanism of FIG. 4
Figure 7:
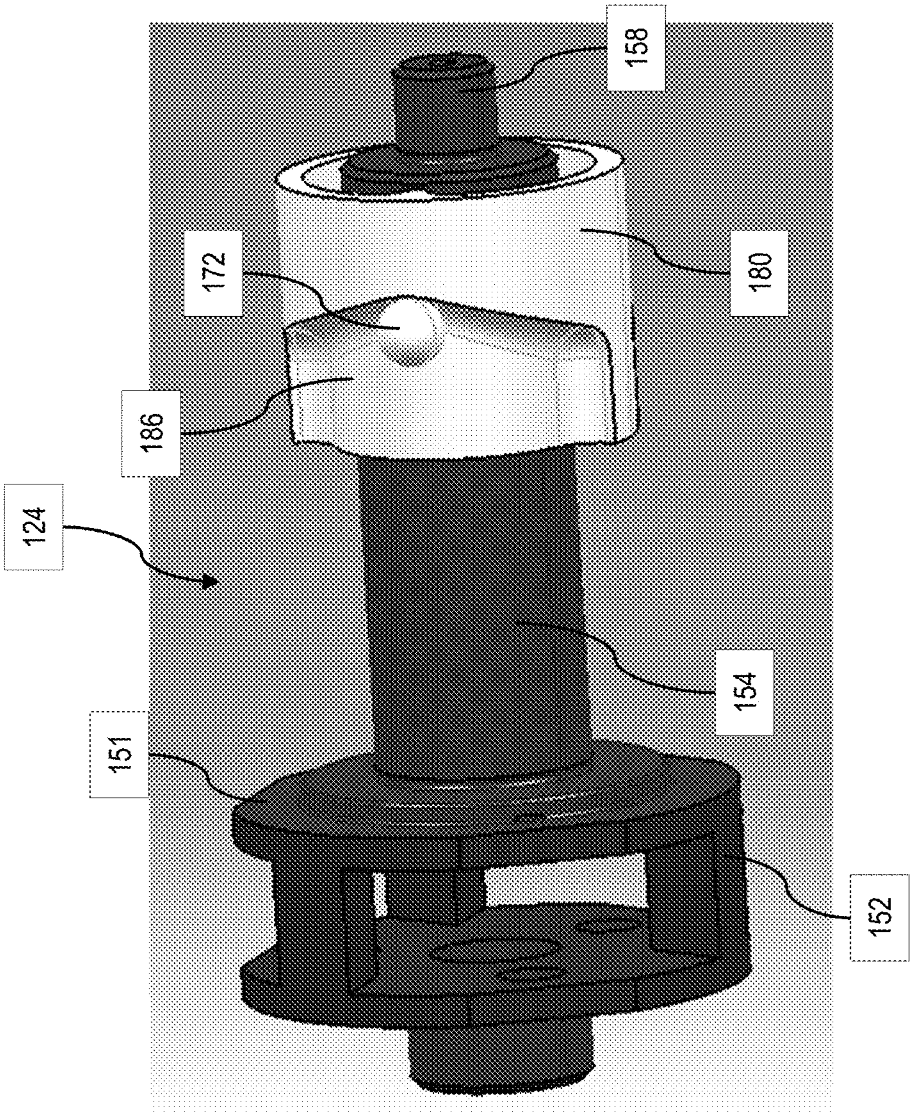
FIG. 7 is a perspective view of a carrier, a cam shaft and cam ring of the impact mechanism of FIG. 4.
Figure 9:
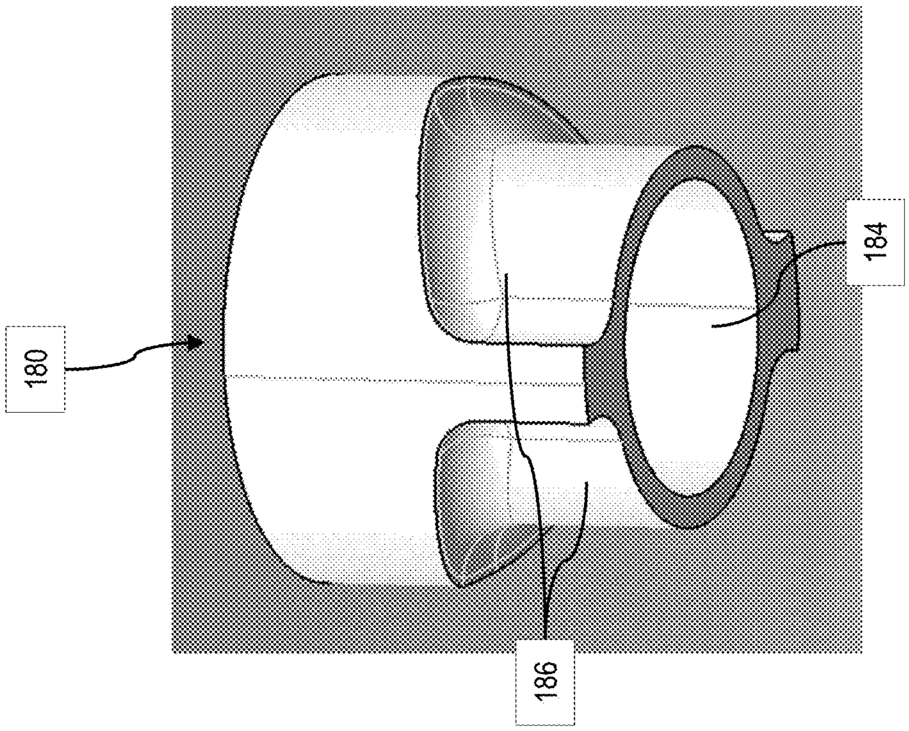
FIGS. 8 and 9 are perspective views of a cam ring of the impact mechanism of FIG. 4.
Figure 8:
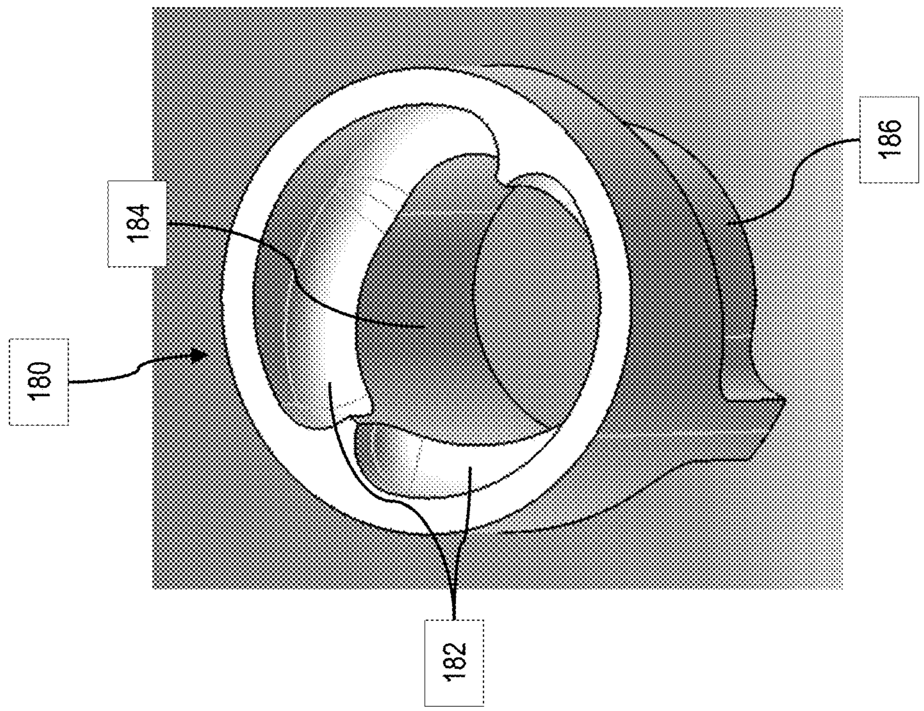
Figure 10:
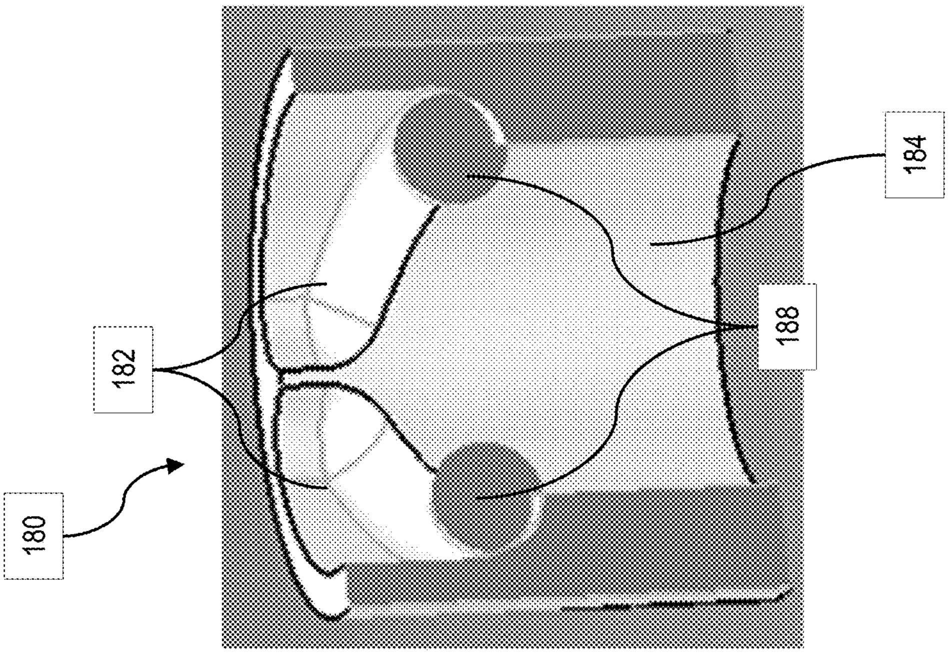
FIG. 10 is a perspective view, partially in section of a cam ring of the impact mechanism of FIG. 4.
Figure 12:
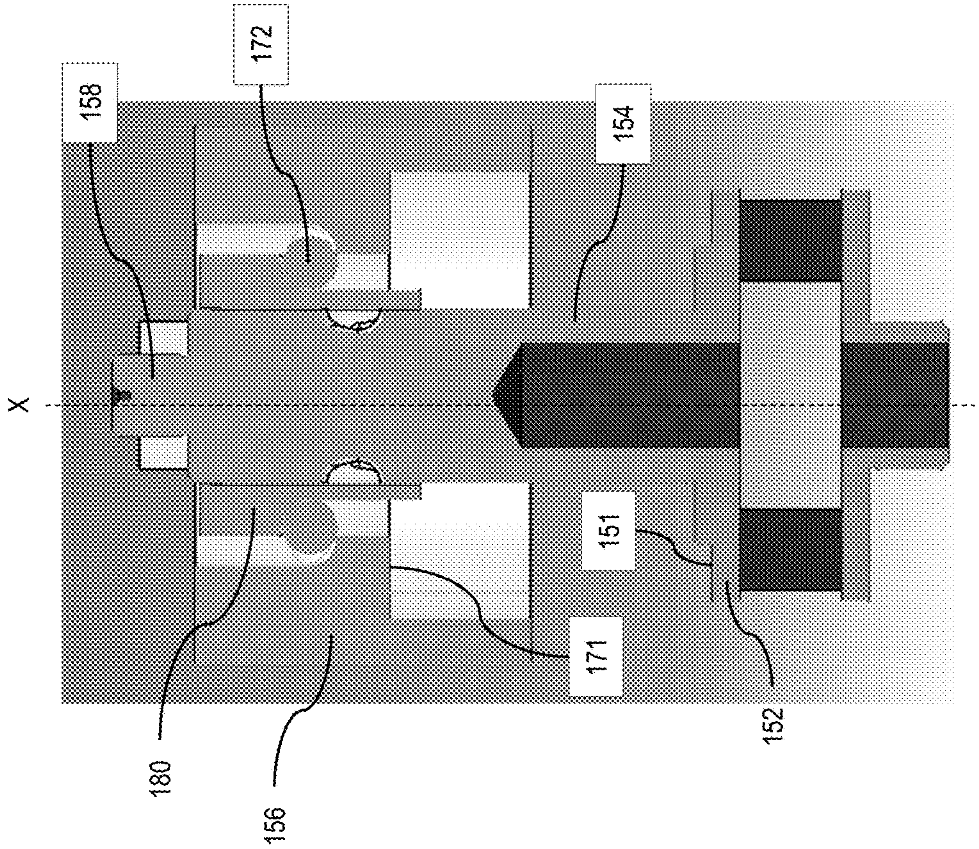
FIGS. 11 and 12 are cross-sectional views of the impact mechanism of FIG. 4.
Figure 11:
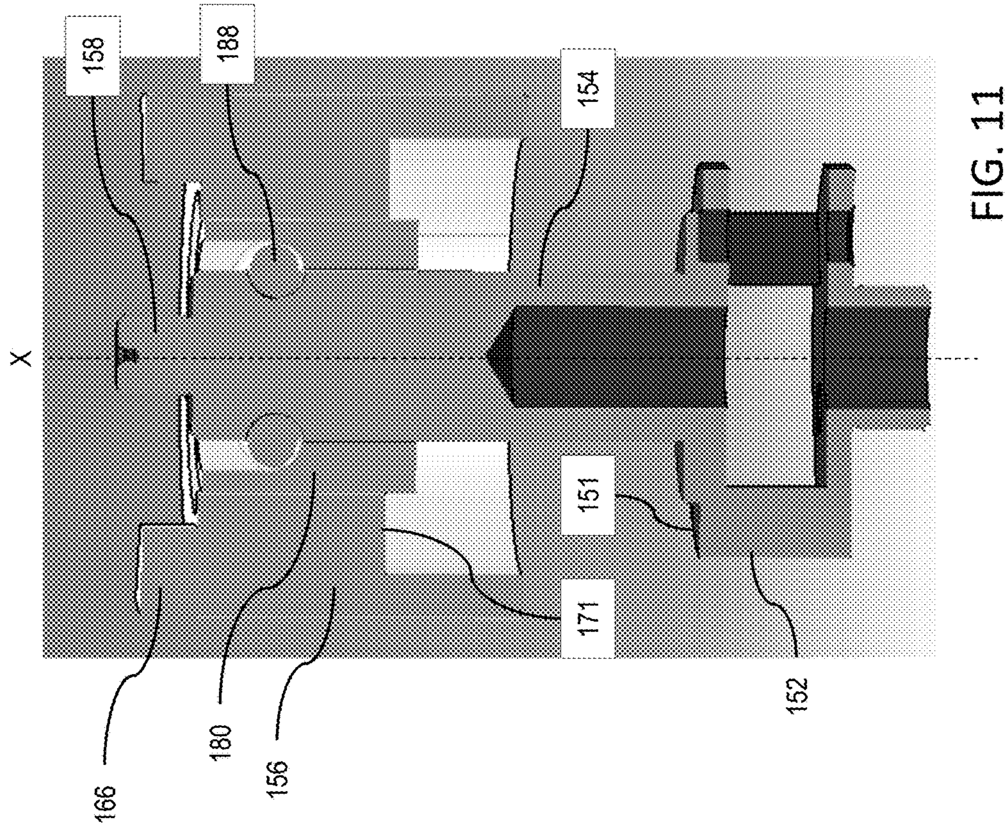
Figure 13:
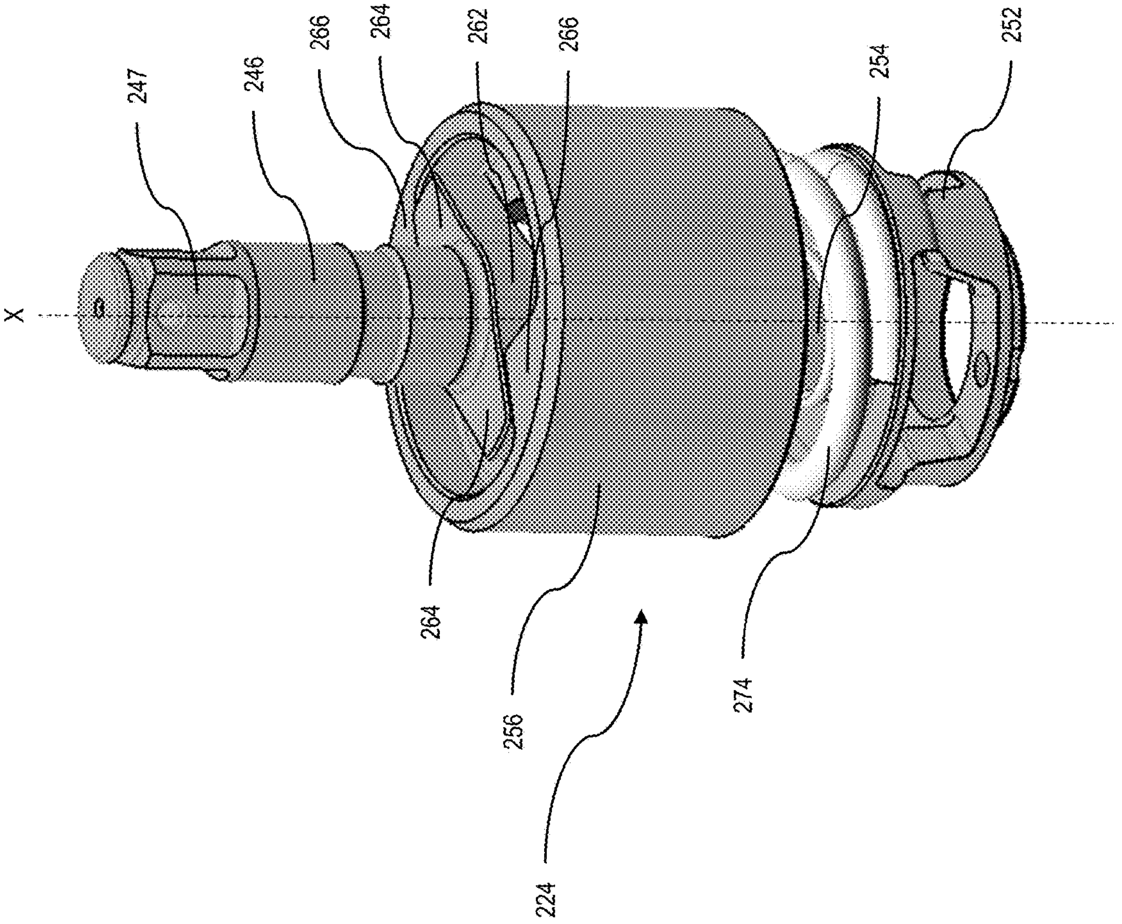
FIG. 13 is a perspective view of another embodiment of an impact mechanism.
Figure 14:
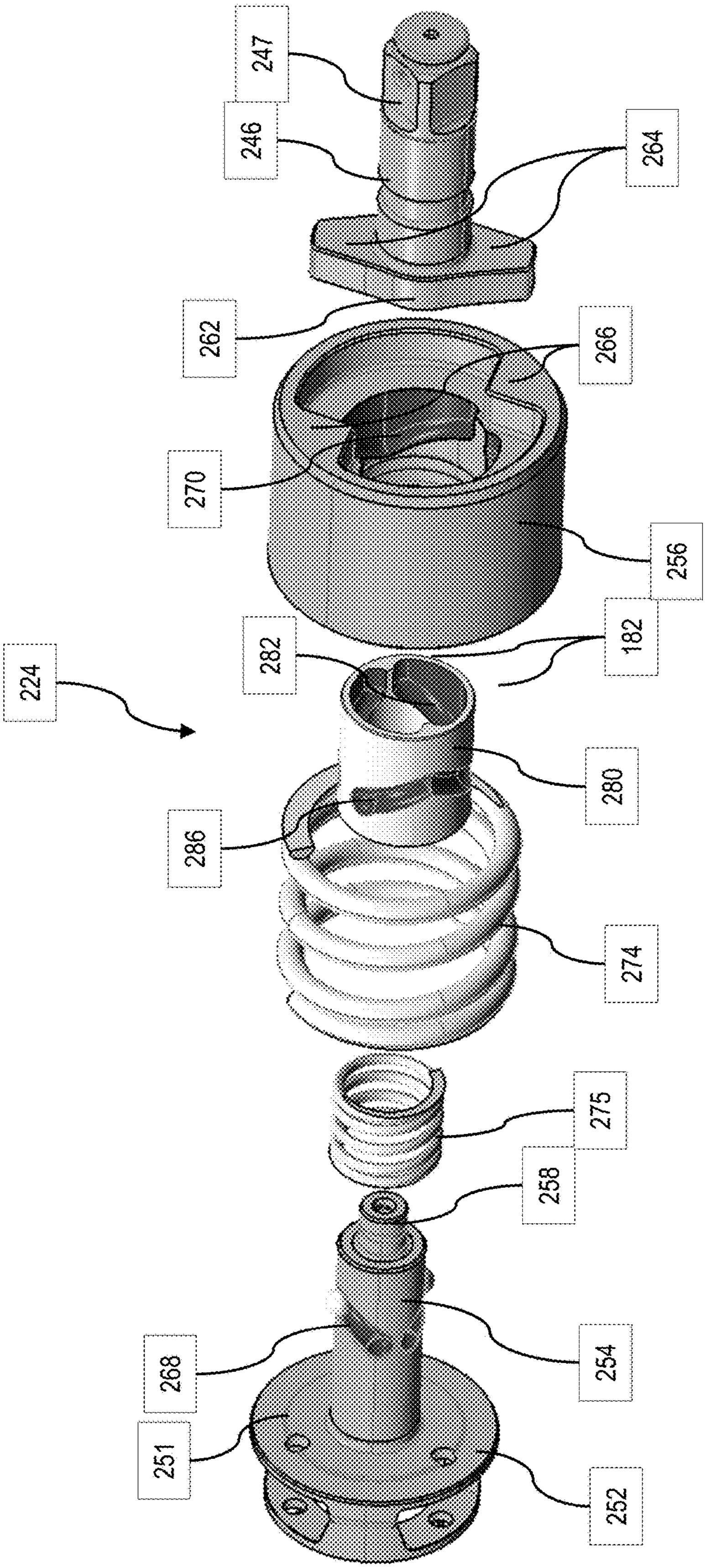
FIG. 14 is an exploded view of the impact mechanism of FIG. 13.

Referring also to FIG. 3, in an embodiment, the transmission 23 may be a planetary transmission that includes a pinion or sun gear 44 that is coupled to an output shaft 46 of the motor 20 and that extends along the axis X. One or more planet gears 48 surround and have teeth that mesh with the teeth on the sun gear 44. An outer ring gear 50 is rotationally fixed to the housing 12 and centered on the axis X with its internal teeth meshing with the teeth on the planet gears 48. The planet gears 48 are pivotally coupled to a planet carrier 52. When the motor 20 is energized, it causes the motor output shaft 46 and the sun gear 44 to rotate about the axis X. Rotation of the sun gear 44 causes the planet gears 48 to orbit the sun gear 44 about the axis X, which in turn causes the planet carrier 52 to rotate about the axis X at a reduced speed relative to the rotational speed of the motor output shaft 46. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission, a spur gear transmission, or a right angle transmission.

In an embodiment, the impact mechanism 24 may include a cam shaft 54 extending along the tool axis X and fixedly coupled to the planet carrier 52 so that they rotate together. Received over the cam shaft 54 is a cylindrical hammer 56 that is configured to move rotationally and axially relative to the cam shaft 54. The cam shaft 54 also has a front end 58 of smaller diameter that is rotatably received in an axial opening 60 in the output spindle 26. Fixedly coupled to a rear end of the output spindle 26 is an anvil 62 having two radial projections 64. The hammer 56 has two hammer projections 66 on its front end that lie in the same rotational plane as the radial projections 64 of the anvil 62 so that each hammer projection 66 may engage a corresponding anvil projection 64 in a rotating direction. In other embodiments, the hammer and/or the anvil may have different numbers of projections.

Formed on an outer wall of the cam shaft 54 is a pair of angled or curved (e.g., rear-facing V-shaped, U-shaped, or parabolic) cam grooves 68 with their open ends facing toward the rear end portion 16 of the housing 12. A corresponding pair of angled or curved (e.g., forward-facing V-shaped, U-shaped, or parabolic) cam grooves (not shown) is formed on an interior wall of the hammer 56 with their open ends facing toward the front end portion 14 of the housing 12. One or more balls 72 are received in and ride along each of the cam grooves 68 on the cam shaft and the cam grooves on the hammer to couple the hammer 56 to the cam shaft 54. A compression spring 74 is received in a cylindrical recess in the hammer 56 and abuts a forward face of the planet carrier 52. The spring 74 biases the hammer 56 toward the anvil 62 so that the hammer projections 66 engage the corresponding anvil projections 64.

At low torque levels, the impact mechanism 24 transmits torque to the output spindle 26 in a rotary mode. In the rotary mode, the compression spring 74 maintains the hammer 56 in its most forward position so that the hammer projections 66 engage the anvil projections 64. This causes the cam shaft 54, the hammer 56, the anvil 62 and the output spindle to rotate together as a unit about the tool axis X-X so that the output spindle 26 has substantially the same rotational speed as the cam shaft 54.

As the torque increases to exceed a torque transition threshold (also known as a trip torque), the impact mechanism 24 transmits torque to the output spindle 26 in an impact mode. In the impact mode, the hammer 56 moves axially rearwardly against the force of the spring 74. This decouples the hammer projections 66 from the anvil projections 64 so that the anvil is decoupled from the cam shaft 54. Meanwhile, the cam shaft 54 continues to be driven by the motor 20 and transmission 23. As this occurs, the hammer 56 moves axially rearwardly relative to the anvil 62 by the movement of the balls 72 rearwardly in the first angled or curved (e.g., V-shaped, U-shaped, parabolic) cam grooves 68. When the spring force and the torque of the motor overcomes the inertia of the hammer, the spring 74 drives the hammer 56 axially forward such that the hammer projections 66 rotationally strike the anvil projections 64, imparting a rotational impact to the output spindle 26. This impacting operation repeats as long as the torque on the output spindle 26 continues to exceed the torque transition threshold. This application refers to this operation as impact operation.

The transition torque threshold for when the impact mechanism 24 transitions from the rotary operation to impact operation is a function of various factors, including the mechanical characteristics of the components of the impact mechanism 24, such as the inertia of the hammer 56 and the force and rate of the spring 74, motor performance characteristics, such as motor speed or acceleration, and external characteristics, such as the tightness of the joint at the workpiece, the fastener, and/or loading of the output spindle. Thus, under different conditions of operation, the transition torque threshold may vary.

Referring to FIGS. 4-12, in another example, an impact mechanism 124 includes a planet carrier 152, which carries the planet gears of the transmission and a cam shaft 154 extending along the tool axis X-X and fixedly coupled to the planet carrier 152 so that they rotate together. Received over the cam shaft 154 is a cylindrical cam ring 180 and received over the cam ring 180 is a generally cylindrical hammer 156, each of which are configured to move rotationally and axially relative to the cam shaft 154. The cam shaft 154 also has a front end 158 of smaller diameter that is rotatably received in an axial opening in an anvil (not shown), which has a similar configuration as the anvil 62 described above and the anvil 262 described below. The hammer 156 has two hammer projections 166 on its front end that may engage two corresponding anvil projections on the anvil in a rotating direction. In other embodiments, the hammer and/or the anvil may have different numbers of projections.

Formed on an outer wall of the cam shaft 154 is a first pair of rearward-facing angled or curved (e.g., V-shaped, U-shaped, parabolic) cam grooves 168 with their open ends facing toward the planet carrier 152 of the cam shaft 154. A corresponding first pair of forward-facing angled or curved (e.g., V-shaped, U-shaped, parabolic) cam grooves 182 is formed on an interior wall 184 of the cam ring 180 with their open ends facing toward the front end portion 158 of the cam shaft 154. One or more first balls 188 are received in and ride along the first pair of rearward-facing cam grooves 168 and the first pair of forward-facing cam grooves 182 to couple the cam ring 180 to the cam shaft 154.

Formed on an outer wall of the cam ring 180 is a second pair of rearward-facing angled or curved (e.g., V-shaped, U-shaped, parabolic) cam grooves 186 with their open ends facing toward the planet carrier 152 of the cam shaft 154. A corresponding second pair of forward-facing angled or curved (e.g., V-shaped, U-shaped, parabolic) cam grooves 170 is formed on an interior wall 173 of the hammer 156 with their open ends facing toward the front end portion 158 of the cam shaft 154. One or more second balls 172 are received in and ride along each of the second pair of rearward-facing cam grooves 186 and the second pair of forward-facing cam grooves 170 to couple the hammer 156 to the cam ring 180. Optionally, the second pair of rearward-facing cam grooves 186 on the cam ring 180 may be angularly offset from the first pair of rearward-facing cam grooves 168 on the cam shaft 154 (e.g., by 90 degrees) and the second pair of forward-facing cam grooves 170 on the hammer 156 may be angularly offset from the first pair of forward-facing cam grooves 182 on the cam ring 180.

A compression spring (not shown), similar to spring 74 described above, abuts a forward face 151 of the planet carrier 152 and an interior shoulder 171 inside the hammer 156 to bias the hammer 156 away from the planet carrier 152 and toward the anvil. At low torque levels, the compression spring maintains the cam ring 180 in its forwardmost position relative to the cam shaft 154 and the hammer 156 in its forwardmost position relative to the cam ring 180 so that the hammer projections 166 engage the anvil projections. This causes the impact mechanism 124 to operate in a rotary mode, where the cam shaft 154, the cam ring 180, the hammer 156, and the anvil rotate together as a unit about the axis X-X at substantially the same rotational speed.

As the torque increases to exceed a torque transition threshold, the impact mechanism 124 transmits torque to the anvil in an impact mode. In the impact mode, as the torque increases, the first balls 188 move along the first pair of rearward-facing cam grooves 168 and the first set of forward-facing cam grooves 182, so that the cam ring 180 moves rotatably and axially rearward relative to the cam shaft 154. At the same time, the second balls 172 move along the second pair of rearward-facing cam grooves 186 and the second set of forward-facing cam grooves 170, so that the hammer 156 moves rotatably and axially rearward relative to the cam ring 180 against the force of the spring. This decouples the hammer projections 166 from the anvil projections so that the anvil is decoupled from the cam shaft. Meanwhile, the camshaft 154, the cam ring 180, and the hammer 156 continue to be driven. As this occurs, the cam ring 180 and the hammer 156 move axially rearwardly relative to the anvil by the movement of the balls rearwardly in the cam grooves. When the spring force and the torque of the motor overcomes the inertia of the hammer, the spring drives the cam ring 180 rotationally and axially forward relative to the cam shaft 154 and the hammer 156 rotationally and axially forward relative to the cam ring 180, such that the rotational speed of the hammer 156 exceeds the rotational speed of the cam shaft 154. This causes the hammer projections 166 to rotationally strike the anvil projections, imparting a rotational impact to the anvil. This impacting operation repeats as long as the torque on the output spindle continues to exceed a torque threshold.

The impact mechanism 124 provides at least the following potential advantages as compared to the existing impact mechanism shown 24 in FIG. 1. For example, the addition of a cam ring that is nested between the cam shaft and the hammer allows the first rearward-facing and forward-facing cam grooves 168, 182 and the second rearward-facing and forward facing cam grooves 170, 186 to be at shallower angles relative to a plane perpendicular to the axis X than the angle of the cam grooves 68 in the impact mechanism 24 of FIG. 2. This enables a stiffer spring to be used while achieving the same or greater torque output with less axial travel of the hammer. In addition, the cam ring that is nested between the cam shaft and the hammer enables greater rotational travel of the hammer relative to the cam shaft in the same or smaller axial distance of travel, which may enable greater torque output.

Referring to FIGS. 13-16, in another example, an impact mechanism 224 for an impact wrench includes a planet carrier 252, which carries the planet gears of the transmission and a cam shaft 254 extending along the tool axis X-X and fixedly coupled to the planet carrier 252 so that they rotate together. Received over the cam shaft 254 is a cylindrical cam ring 280 and received over the cam ring 280 is a generally cylindrical hammer 256, each of which are configured to move rotationally and axially relative to the cam shaft 254. The cam shaft 254 also has a front end 258 of smaller diameter that is rotatably received in an axial opening in an anvil 262. The anvil 262 has two anvil projections 264 and is coupled to an output shaft 246 with a square drive tool holder 247 for retaining a socket tool on the output shaft. The hammer 256 has two hammer projections 266 on its front end that may engage the two corresponding anvil projections 264 on the anvil in a rotating direction. In other embodiments, the hammer and/or the anvil may have different numbers of projections.

Formed on an outer wall of the cam shaft 254 is a first pair of rearward-facing angled or curved (e.g., V-shaped, U-shaped, parabolic) cam grooves 268 with their open ends facing toward the planet carrier 252 of the cam shaft 254. A corresponding first pair of forward-facing angled or curved (e.g., V-shaped, U-shaped, parabolic) cam grooves 282 is formed on an interior wall of the cam ring 280 with their open ends facing toward the front end portion 258 of the cam shaft 254. One or more first balls 288 are received in and ride along the first pair of rearward-facing cam grooves 268 and the first pair of forward-facing cam grooves 282 to couple the cam ring 280 to the cam shaft 254.

Formed on an outer wall of the cam ring 280 is a second pair of rearward-facing angled or curved (e.g., V-shaped, U-shaped, parabolic) cam grooves 286 with their open ends facing toward the planet carrier 252 of the cam shaft 254. A corresponding second pair of forward-facing angled or curved (e.g., V-shaped, U-shaped, parabolic) cam grooves 270 is formed on an interior wall of the hammer 256 with their open ends facing toward the front end portion 258 of the cam shaft 254. One or more second balls 272 are received in and ride along each of the second pair of rearward-facing cam grooves 286 and the second pair of forward-facing cam grooves 270 to couple the hammer 256 to the cam ring 280. Optionally, the second pair of rearward-facing cam grooves 286 on the cam ring 280 may be angularly offset from the first pair of rearward-facing cam grooves 268 on the cam shaft 254 (e.g., by 90 degrees) and the second pair of forward-facing cam grooves 270 on the hammer 256 may be angularly offset from the first pair of forward-facing cam grooves 282 on the cam ring 280.

A first compression spring 274 abuts a forward face 251 of the planet carrier 252 and an interior shoulder inside the hammer 256 to bias the hammer 256 away from the planet carrier 252 and toward the anvil 262. Optionally, a second compression spring 275 abuts the forward face 251 of the planet carrier 252 and a rear end portion of the cam ring 280 to bias the cam ring 280 away from the planet carrier 252 and toward the anvil. The second spring 275 may provide a force to supplement the force of the first spring. The first and second springs may have the same or different spring constants, lengths, wire diameters, and force profiles.

Figure 15:
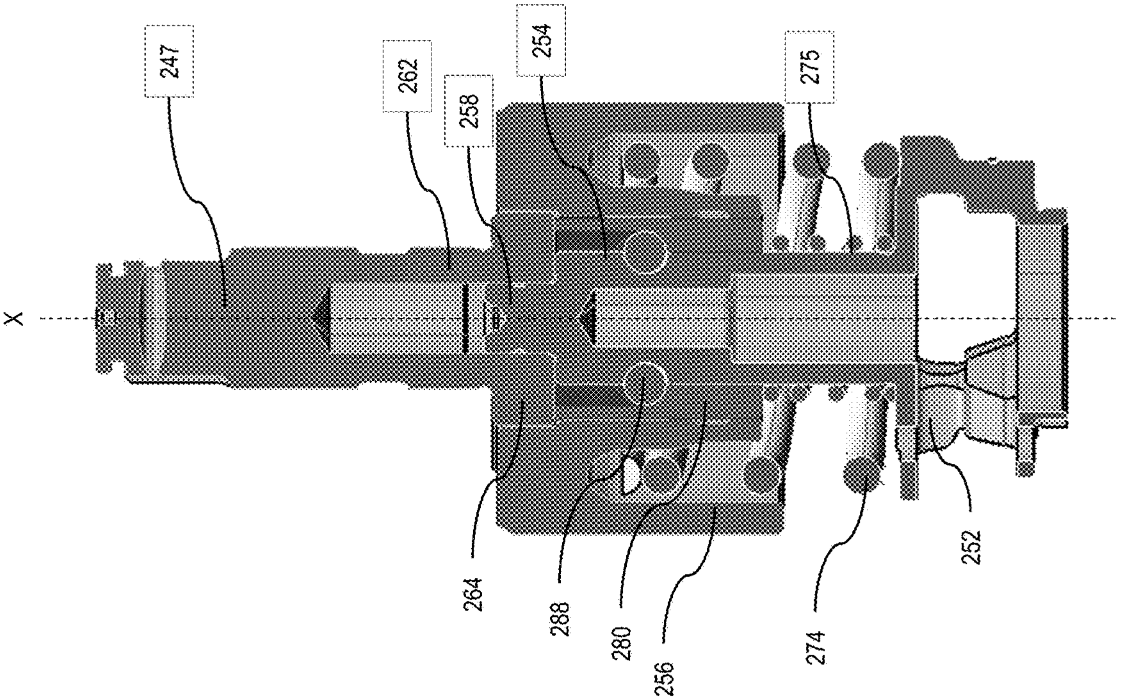
FIG. 15 is a cross-sectional view of the impact mechanism of FIG. 13 showing the hammer in a forward position.

As shown in FIG. 15, at low torque levels, the springs 274, 275 maintains the cam ring 280 and the hammer 256 in their forwardmost position relative to the cam shaft 254 so that the hammer projections 266 engage the anvil projections 264. This causes the impact mechanism 224 to operate in a rotary mode, where the cam shaft 254, the cam ring 280, the hammer 256, and the anvil rotate together as a unit about the axis X-X at substantially the same rotational speed.

Figure 16:
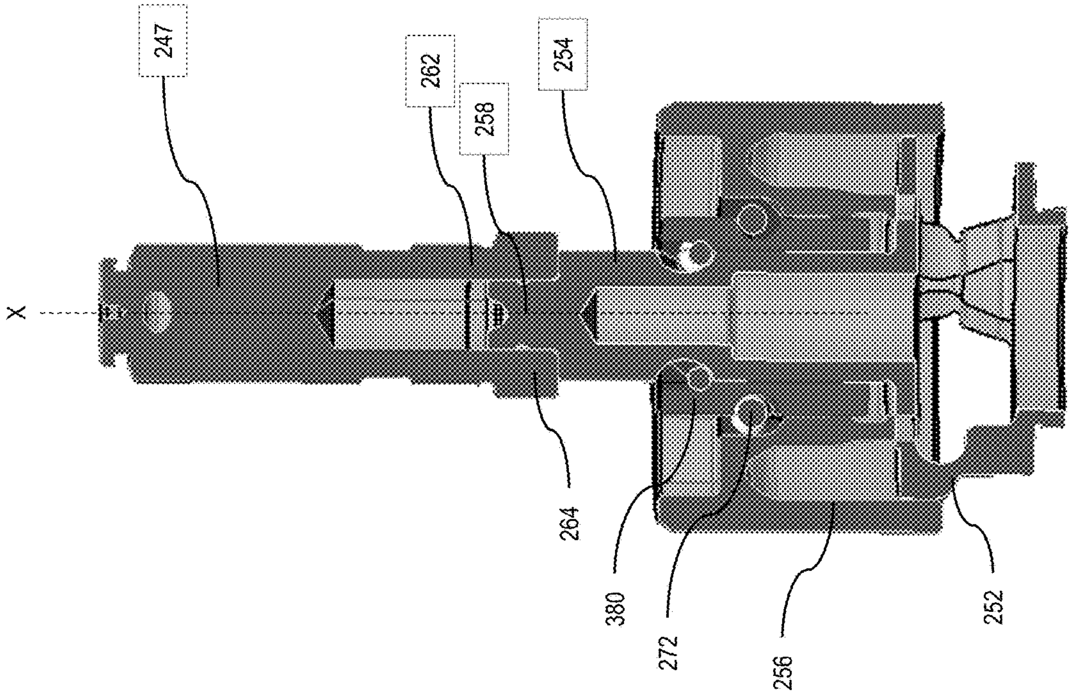
FIG. 16 is a cross-sectional view of the impact mechanism of FIG. 13 showing the hammer in a rearward position.

As shown in FIG. 16, when the torque increases to exceed a torque transition threshold, the impact mechanism 224 transmits torque to the anvil in an impact mode. In the impact mode, as the torque increases, the first balls 288 move along the first pair of rearward-facing cam grooves 268 and the first set of forward-facing cam grooves 282, so that the cam ring 280 moves rotatably and axially rearward relative to the cam shaft 254. At the same time, the second balls 272 move along the second pair of rearward-facing cam grooves 286 and the second set of forward-facing cam grooves 270, so that the hammer 256 moves rotatably and axially rearward relative to the cam ring 280 against the force of the springs. This decouples the hammer projections 266 from the anvil projections so that the anvil is decoupled from the cam shaft. Meanwhile, the camshaft 254, the cam ring 280, and the hammer 256 continue to be driven. As this occurs, the cam ring 280 and the hammer 256 move axially rearwardly relative to the anvil by the movement of the balls rearwardly in the cam grooves. When the spring force and the torque of the motor overcomes the inertia of the hammer, the spring drives the cam ring 280 rotationally and axially forward relative to the cam shaft 254 and the hammer 256 rotationally and axially forward relative to the cam ring 280, such that the rotational speed of the hammer 256 exceeds the rotational speed of the cam shaft 254. This causes the hammer projections 266 to rotationally strike the anvil projections 264, imparting a rotational impact to the anvil. This impacting operation repeats as long as the torque on the output spindle continues to exceed a torque threshold.

In alternative designs, the impact mechanism may have multiple first springs that bias the hammer axially forward and/or multiple second springs between the planet carrier and the cam ring that bias the cam ring axially forward. The second spring may be nested inside the first spring or vice versa. The springs may have similar or different spring constants, wire diameters, and/or lengths. In each of these designs, the spring(s) cause the hammer and/or the cam ring to be biased axially forward away from the transmission and toward the anvil.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A powered rotary impact tool comprising:

a housing;

a motor disposed in the housing;

an output shaft;

a transmission configured to be driven by the motor; and an impact mechanism configured to be driven by the transmission and to transmit torque from the transmission to the output tool holder, the impact mechanism including a cam shaft extending along an axis and configured to be rotatably driven by an output member of the transmission, the cam shaft defining a first cam groove on an outer surface of the cam shaft;

a cam ring received over the cam shaft and defining a second cam groove on an inner surface of the cam ring and a third cam groove on an outer surface of the cam ring;

a hammer received over the cam ring and defining a fourth cam groove on an inner surface of the hammer and including a hammer projection on a front portion of the hammer;

an anvil coupled to the output shaft for rotation with the output shaft, the anvil having an anvil projection configured to be selectively engaged by the hammer projection;

a first spring configured to bias the hammer toward the anvil;

a first ball received in the first cam groove and the second cam groove and configured to couple the cam ring to the cam shaft for rotational and axial movement relative to the cam shaft; and a second ball received in the third cam groove and the fourth cam groove and configured to couple the hammer to the cam ring for rotational and axial movement relative to the cam ring, wherein when torque on the output shaft is less than or equal to a threshold amount, the first spring maintains the hammer in its forwardmost position relative to the cam shaft so that the hammer projection engages the anvil projection, and the cam shaft, the cam ring, the hammer, and the anvil rotate together as a unit about the axis, and wherein when torque on the output shaft increases to exceeds the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the first spring force and the torque of the motor overcomes the inertia of the hammer, the first spring drives the cam ring rotationally and axially forward relative to the cam shaft and the hammer rotationally and axially forward relative to the cam ring, such that the hammer projection rotationally strikes the anvil projection to impart a rotational impact to the anvil.

2. The rotary impact tool of claim 1, wherein the first cam groove and the second cam groove are angled or curved.

3. The rotary impact tool of claim 2, wherein the first cam groove is V-shaped with an open end of the first cam groove facing rearward away from the anvil.

4. The rotary impact tool of claim 3, wherein the second cam groove is V-shaped with an open end of the second cam groove facing forward toward the anvil.

5. The rotary impact tool of claim 1, wherein the third cam groove and the fourth cam groove are angled or curved.

6. The rotary impact tool of claim 5, wherein the third cam groove is V-shaped with an open end of the first cam groove facing rearward away from the anvil.

7. The rotary impact tool of claim 6, wherein the fourth cam groove is V-shaped with an open end of the second cam groove facing forward toward the anvil.

8. The rotary impact tool of claim 1, wherein the third cam groove is angularly offset from the first cam groove and the fourth cam groove is angularly offset from the second cam groove.

9. The rotary impact tool of claim 1, wherein the first spring is disposed between the transmission and the hammer.

10. The rotary impact tool of claim 9, further comprising a second spring disposed between the transmission and the cam ring.

11. A powered rotary impact tool comprising:

a cam shaft extending along an axis and configured to be rotatably driven upon actuation of the power tool, the cam shaft defining a first cam groove on an outer surface of the cam shaft;

a cam ring received over the cam shaft and defining a second cam groove on an inner surface of the cam ring and a third cam groove on an outer surface of the cam ring;

a hammer received over the cam ring and defining a fourth cam groove on an inner surface of the hammer and including a hammer projection on a front portion of the hammer;

an anvil including an output shaft and an anvil projection configured to be selectively engaged by the hammer projection;

a first spring configured to bias the hammer toward the anvil;

a first ball received in the first cam groove and the second cam groove and configured to couple the cam ring to the cam shaft for rotational and axial movement relative to the cam shaft; and a second ball received in the third cam groove and the fourth cam groove and configured to couple the hammer to the cam ring for rotational and axial movement relative to the cam ring, wherein when torque on the output shaft is less than or equal to a threshold amount, the first spring maintains the hammer in its forwardmost position relative to the cam shaft so that the hammer projection engages the anvil projection, and the cam shaft, the cam ring, the hammer, and the anvil rotate together as a unit about the axis, and wherein when torque on the output shaft increases to exceed the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the first spring force and the torque of the motor overcomes the inertia of the hammer, the first spring drives the cam ring rotationally and axially forward relative to the cam shaft and the hammer rotationally and axially forward relative to the cam ring, such that the hammer projection rotationally strikes the anvil projection to impart a rotational impact to the anvil.

12. The rotary impact tool of claim 11, wherein the first cam groove and the second cam groove are angled or curved.

13. The rotary impact tool of claim 12, wherein the first cam groove is V-shaped with an open end of the first cam groove facing rearward away from the anvil.

14. The rotary impact tool of claim 13, wherein the second cam groove is V-shaped with an open end of the second cam groove facing forward toward the anvil.

15. The rotary impact tool of claim 14, wherein the third cam groove is V-shaped with an open end of the first cam groove facing rearward away from the anvil.

16. The rotary impact tool of claim 15, wherein the fourth cam groove is V-shaped with an open end of the second cam groove facing forward toward the anvil.

17. The rotary impact tool of claim 11, wherein the third cam groove is angularly offset from the first cam groove and the fourth cam groove is angularly offset from the second cam groove.

18. The rotary impact tool of claim 11, wherein the first spring is disposed between the transmission and the hammer.

19. The rotary impact tool of claim 11, further comprising a second spring disposed between the transmission and the cam ring.

20. A powered rotary impact tool comprising:

a housing;

a motor disposed in the housing;

an output shaft;

a tool holder coupled to the output shaft for rotation with the output shaft;

a transmission configured to be driven by the motor; and an impact mechanism configured to be driven by the transmission and to transmit torque from the transmission to the output tool holder, the impact mechanism including a cam shaft extending along an axis and configured to be rotatably driven by an output member of the transmission, the cam shaft defining a first V-shaped cam groove on an outer surface of the cam shaft;

a cam ring received over the cam shaft and defining a second V-shaped cam groove on an inner surface of the cam ring facing an opposite direction from the first V-shaped cam groove, and a third V-shaped cam groove on an outer surface of the cam ring offset angularly from the first V-shaped cam groove;

a hammer received over the cam ring and defining a fourth V-shaped cam groove on an inner surface of the hammer facing an opposite direction from the third V-shaped cam groove and offset angularly from the second V-shaped cam groove, the hammer including a hammer projection on a front portion of the hammer;

an anvil coupled to the output shaft for rotation with the output shaft, the anvil having an anvil projection configured to be selectively engaged by the hammer projection;

a spring between the transmission and the hammer to bias the hammer toward the anvil;

a first ball received in the first cam groove and the second cam groove and configured to couple the cam ring to the cam shaft for rotational and axial movement relative to the cam shaft; and a second ball received in the third cam groove and the fourth cam groove and configured to couple the hammer to the cam ring for rotational and axial movement relative to the cam ring, wherein when torque on the output shaft is less than or equal to a threshold amount, the spring maintains the hammer in its forwardmost position relative to the cam shaft so that the hammer projection engages the anvil projection, and the cam shaft, the cam ring, the hammer, and the anvil rotate together as a unit about the axis, and wherein when torque on the output shaft increases to exceed the threshold amount, the first ball moves along the first and second cam grooves so that the cam ring moves rotatably and axially rearward relative to the cam shaft, and the second ball moves along the third and fourth cam grooves, so that the hammer moves rotatably and axially rearward relative to the cam ring, which decouples the hammer projection from the anvil projection, and, when the spring force and the torque of the motor overcomes the inertia of the hammer, the spring drives the cam ring rotationally and axially forward relative to the cam shaft and the hammer rotationally and axially forward relative to the cam ring, such that the hammer projection rotationally strikes the anvil projection to impart a rotational impact to the anvil.

* * * * *